US012794747B2

(12) United States Patent
Sayed Hassan et al.

(10) Patent No.: US 12,794,747 B2
(45) Date of Patent: Nov. 10, 2026

(54) PROBABILISTIC AMPLITUDE SHAPING APPLIED TO PAPR REDUCTION

(71) Applicant: Nokia Technologies Oy, Espoo (FI)

(72) Inventors: Mohamad Sayed Hassan, Massy (FR); Khodor Safa, Nozay (FR); Fanny Jardel, Massy (FR)

(73) Assignee: Nokia Technologies Oy, Espoo (FI)

( * ) Notice: Subject to any disclaimer, the term of this patent is extended or adjusted under 35 U.S.C. 154(b) by 283 days.

(21) Appl. No.: 18/695,251

(22) PCT Filed: Sep. 30, 2021

(86) PCT No.: PCT/EP2021/077001
§ 371 (c)(1),
(2) Date: Mar. 25, 2024

(87) PCT Pub. No.: WO2023/051921
PCT Pub. Date: Apr. 6, 2023

(65) Prior Publication Data

US 2024/0340209 A1 Oct. 10, 2024

(51) Int. Cl.
*H04L 27/26* (2006.01)
*H04L 27/18* (2006.01)
*H04L 27/34* (2006.01)

(52) U.S. Cl.
CPC ........ *H04L 27/2615* (2013.01); *H04L 27/183* (2013.01); *H04L 27/2636* (2013.01); *H04L 27/3411* (2013.01)

(58) Field of Classification Search
CPC ............... H04L 27/2615; H04L 27/183; H04L 27/2636; H04L 27/3411
(Continued)

(56) References Cited

U.S. PATENT DOCUMENTS 8,767,851 B2 7/2014 McGowan et al.
10,084,631 B2 9/2018 Raphaeli et al.
(Continued)

FOREIGN PATENT DOCUMENTS

WO 2021/105546 A1 6/2021
WO WO-2022085137 A1 * 4/2022 ........... H04B 10/516

OTHER PUBLICATIONS

"NR uplink enhancements for Rel-18", 3GPP TSG RAN Rel-18 workshop, RWS-210149, Agenda: 4.1, China Telecom, Jun. 28-Jul. 2, 2021, pp. 1-7.
(Continued)

*Primary Examiner* — Dominic D Saltarelli
(74) *Attorney, Agent, or Firm* — Lippes Mathias LLP

(57) ABSTRACT

According to an example aspect of the present disclosure, there is provided an apparatus comprising memory configured to store a set of probabilities of transitions between modulation symbols, the set of probabilities corresponding to a lower peak-to-average power ratio than a set of equal probabilities of transitions between modulation symbols, distribution matcher circuitry configured to process an input bit sequence into a symbol sequence, wherein frequencies of transitions between symbols in the symbol sequence conform to probabilities in the set of probabilities, a channel coder configured to generate parity bits of unity and negative unity from bit information obtained from the symbol sequence, grouping circuitry configured to assign symbols of the symbol sequence into groups each comprising two or more symbols, and multiplication circuitry configured to multiply each one of the groups with a corresponding one of the parity bits.

20 Claims, 7 Drawing Sheets

(58) Field of Classification Search
USPC .......................................................... 375/260
See application file for complete search history.

(56) References Cited

U.S. PATENT DOCUMENTS

| | | | | |
|---|---|---|---|---|
| 10,764,102 | B2 | 9/2020 | Sahin et al. | |
| 2020/0204325 | A1* | 6/2020 | Liu | H04L 5/001 |
| 2022/0166481 | A1* | 5/2022 | Horn | H04B 1/7107 |
| 2022/0278882 | A1* | 9/2022 | Back | H04L 27/36 |
| 2023/0009343 | A1* | 1/2023 | Abdelhafiz | H04B 1/10 |

OTHER PUBLICATIONS

"Enhanced coverage for Rel-18", RAN Rel-18 Workshop, RWS-210076, Nokia, Jun. 28-Jul. 2, 2021, pp. 1-12.
Hou et al., "Tone Reservation Technique Based on Peak-Windowing Residual Noise for PAPR Reduction in OFDM Systems", IEEE Transactions on Vehicular Technology, vol. 64, No. 11, Nov. 2015, pp. 5373-5378.
Nasarre et al., "Enhanced Uplink Coverage for 5G NR: Frequency-Domain Spectral Shaping With Spectral Extension", IEEE Open Journal of the Communications Society, vol. 2, May 21, 2021, pp. 1188-1204.
Armstrong, "Peak-to-average power reduction for OFDM by repeated clipping and frequency domain filtering", Electronics Letters, vol. 38, No. 05, Feb. 28, 2002, 1 page.
Taspinar et al., "Partial Transmit Sequences for PAPR Reduction Using Parallel Tabu Search Algorithm in OFDM Systems", IEEE Communications Letters, vol. 15, No. 09, Sep. 2011, pp. 974-976.
Nasarre et al., "Constrained PSK: Energy-Efficient Modulation for sub-THz Systems", IEEE International Conference on Communications Workshops (ICC Workshops), Jun. 7-11, 2020, 7 pages.
"Peak-to-Average-Power-Ratio", ScienceDirect, Retrieved on Apr. 7, 2024, Webpage available at : https://www.sciencedirect.com/topics/engineering/peak-to-average-power-ratio.
International Search Report and Written Opinion received for corresponding Patent Cooperation Treaty Application No. PCT/EP2021/077001, dated Jun. 20, 2022, 13 pages.
Bruyssel et al., "G.mgfast: Probabilistic amplitude shaping (PAS) for mgfast", Nokia Corporation, Q4/15-C25 (171127), Study Group 15, Nov. 27, 2017, pp. 1-10.
Levi et al., "A Novel Shaping Scheme for PAPR Reduction in Single-Carrier Modulation", IEEE Transactions on Communications, vol. 66, No. 09, Sep. 2018, pp. 4222-4233.
Tanahashi et al., "Near constant envelope trellis shaping for PSK signaling", IEEE Transactions on Communications, vol. 57, No. 02, Feb. 2009, pp. 450-458.
Safa et al., "Low PAPR Probabilistically Controlled Transitions Scheme", IEEE Wireless Communications and Networking Conference (WCNC), Apr. 10-13, 2022, pp. 2184-2189.

* cited by examiner

PROBABILISTIC AMPLITUDE SHAPING APPLIED TO PAPR REDUCTION

RELATED APPLICATION

This application was originally filed as PCT Application No PCT/EP2021/077001, filed on Sep. 30, 2021, of which is incorporated herein by reference in its entirety.

FIELD

The present disclosure relates to managing transmission of information using a modulation scheme, wherein a peak to average power ratio, PAPR, is managed.

BACKGROUND

A peak to average power ratio, PAPR, is a peak amplitude divided by average power in a transmission. The transmission may be wireless or wire-line in nature, and different modulation schemes produce different PAPR values. The minimum PAPR value is one, indicating that all power is transmitted at the average power and there are no peaks, that is, the transmission takes the form of a square wave or direct current. A sine wave has a PAPR of about three decibels, dB.

When communicating information, it is beneficial to seek to reduce the PAPR of the transmitted signal, since amplifiers used in transmitters have set peak powers, which must be sufficient to transmit the highest peaks of the transmitted signal. The average will then lie below the maximum, and on average the amplifier does not function at its nominal value. The number of bits communicated, on the other hand, is on average proportional to the average transmitted power, wherefore reducing the PAPR enabled communicating at a higher bit rate using a set amplifier.

In fifth generation, 5G, and sixth generation, 6G, wireless communication systems, PAPR management is of interest. For example, 5G envisions a supplementary uplink to be used on a lower frequency than a 5G carrier, which may experience coverage challenges due to high frequencies involved. As to 6G, low-PAPR transmission schemed are of interest in particular for higher-order modulation constellations used in 6G.

Techniques to reduce PAPR include tone reservation and frequency domain spectral shaping, FDSS. However, these techniques do not work well when the modulation used is of a high order, such as 16-quadrature amplitude modulation, 16-QAM, and higher orders such as 32-QAM, for example.

SUMMARY

According to some aspects, there is provided the subject-matter of the independent claims. Some embodiments are defined in the dependent claims. The scope of protection sought for various embodiments of the disclosure is set out by the independent claims. The embodiments, examples and features, if any, described in this specification that do not fall under the scope of the independent claims are to be interpreted as examples useful for understanding various embodiments of the disclosure.

According to a first aspect of the present disclosure, there is provided an apparatus comprising memory configured to store a set of probabilities of transitions between modulation symbols, the set of probabilities corresponding to a lower peak-to-average power ratio than a set of equal probabilities of transitions between modulation symbols, distribution matcher circuitry configured to process an input bit sequence into a symbol sequence, wherein frequencies of transitions between symbols in the symbol sequence conform to probabilities in the set of probabilities, a channel coder configured to generate parity bits from bit information obtained from the symbol sequence, wherein the parity bits are expressed as a sequence of unity and negative unity, grouping circuitry configured to assign symbols of the symbol sequence into groups each comprising two or more symbols, and multiplication circuitry configured to multiply each one of the groups with a corresponding one of the parity bits.

According to a second aspect of the present disclosure, there is provided an apparatus comprising memory configured to store a set of probabilities of transitions between modulation symbols, the set of probabilities corresponding to a lower peak-to-average power ratio than a set of equal probabilities of transitions between modulation symbols, a channel coder configured to generate bit information from a bit sequence received, the apparatus being further configured to convert the bit information into a symbol sequence in amplitude domain, and inverse distribution matcher circuitry configured to process the symbol sequence into an input bit sequence, wherein frequencies of transitions between symbols in the symbol sequence conform to probabilities in the set of probabilities.

According to a third aspect of the present disclosure, there is provided a method comprising storing, in a memory, a set of probabilities of transitions between modulation symbols, the set of probabilities corresponding to a lower peak-to-average power ratio than a set of equal transition probabilities of transitions between modulation symbols, processing an input bit sequence into a symbol sequence, wherein frequencies of transitions between symbols in the symbol sequence conform to probabilities in the set of probabilities, generating parity bits from bit information obtained from the symbol sequence, wherein the parity bits are expressed as a sequence of unity and negative unity, assigning symbols of the symbol sequence into groups each comprising two or more symbols, and multiplying each one of the groups with a corresponding one of the parity bits.

According to a fourth aspect of the present disclosure, there is provided a method, comprising storing a set of probabilities of transitions between modulation symbols, the set of probabilities corresponding to a lower peak-to-average power ratio than a set of equal probabilities of transitions between modulation symbols, generating bit information from a bit sequence received, the apparatus being further configured to convert the bit information into a symbol sequence in amplitude domain, and processing the symbol sequence into an input bit sequence, wherein frequencies of transitions between symbols in the symbol sequence conform to probabilities in the set of probabilities.

According to a fifth aspect of the present disclosure, there is provided an apparatus comprising means for storing, in a memory, a set of probabilities of transitions between modulation symbols, the set of probabilities corresponding to a lower peak-to-average power ratio than a set of equal probabilities of transitions between modulation symbols, processing an input bit sequence into a symbol sequence, wherein frequencies of transitions between symbols in the symbol sequence conform to probabilities in the set of probabilities, generating parity bits from bit information obtained from the symbol sequence, wherein the parity bits are expressed as a sequence of unity and negative unity, assigning symbols of the symbol sequence into groups each comprising two or more symbols, and multiplying each one of the groups with a corresponding one of the parity bits.

According to a sixth aspect of the present disclosure, there is provided an apparatus comprising means for storing a set of probabilities of transitions between modulation symbols, the set of probabilities corresponding to a lower peak-to-average power ratio than a set of equal probabilities of transitions between modulation symbols, generating bit information from a bit sequence received, the apparatus being further configured to convert the bit information into a symbol sequence in amplitude domain, and processing the symbol sequence into an input bit sequence, wherein frequencies of transitions between symbols in the symbol sequence conform to probabilities in the set of probabilities.

According to a seventh aspect of the present disclosure, there is provided a non-transitory computer readable medium having stored thereon a set of computer readable instructions that, when executed by at least one processor, cause an apparatus to at least store, in a memory, a set of probabilities of transitions between modulation symbols, the set of probabilities corresponding to a lower peak-to-average power ratio than a set of equal probabilities of transitions between modulation symbols, process an input bit sequence into a symbol sequence, wherein frequencies of transitions between symbols in the symbol sequence conform to probabilities in the set of probabilities, generate parity bits from bit information obtained from the symbol sequence, wherein the parity bits are expressed as a sequence of unity and negative unity, assign symbols of the symbol sequence into groups each comprising two or more symbols, and multiply each one of the groups with a corresponding one of the parity bits.

According to an eighth aspect of the present disclosure, there is provided a non-transitory computer readable medium having stored thereon a set of computer readable instructions that, when executed by at least one processor, cause an apparatus to at least store a set of probabilities of transitions between modulation symbols, the set of probabilities corresponding to a lower peak-to-average power ratio than a set of equal probabilities of transitions between modulation symbols, generate bit information from a bit sequence received, the apparatus being further configured to convert the bit information into a symbol sequence in amplitude domain, and process the symbol sequence into an input bit sequence, wherein frequencies of transitions between symbols in the symbol sequence conform to probabilities in the set of probabilities.

According to a ninth aspect of the present disclosure, there is provided a computer program configured to cause an apparatus to perform at least the following, when run: store, in a memory, a set of probabilities of transitions between modulation symbols, the set of probabilities corresponding to a lower peak-to-average power ratio than a set of equal probabilities of transitions between modulation symbols, process an input bit sequence into a symbol sequence, wherein frequencies of transitions between symbols in the symbol sequence conform to probabilities in the set of probabilities, generate parity bits from bit information obtained from the symbol sequence, wherein the parity bits are expressed as a sequence of unity and negative unity, assign symbols of the symbol sequence into groups each comprising two or more symbols, and multiply each one of the groups with a corresponding one of the parity bits.

According to a tenth aspect of the present disclosure, there is provided a computer program configured to cause an apparatus to perform at least the following, when run: store a set of probabilities of transitions between modulation symbols, the set of probabilities corresponding to a lower peak-to-average power ratio than a set of equal probabilities of transitions between modulation symbols, generate bit information from a bit sequence received, the apparatus being further configured to convert the bit information into a symbol sequence in amplitude domain, and process the symbol sequence into an input bit sequence, wherein frequencies of transitions between symbols in the symbol sequence conform to probabilities in the set of probabilities.

EMBODIMENTS

A low-PAPR transmission scheme is herein described, suitable for different waveforms, such as DFT-s-OFDM. The disclosed scheme may be applied in amplitude modulation, for example QAM modulation, for example, in long term evolution, LTE, or new radio, NR, systems. The present disclosure aims to facilitate PAPR control also in higher-order modulation, such as QAM-16 or QAM-32 as well as other modulation schemes, such as PSK and APSK. In detail, a binary sequence of randomly or pseudo-randomly distributed information bits, forming the information to be transmitted, is processed in a distribution matcher, DM, mechanism to generate a sequence of symbols encoding the information and complying with a predefined distribution of symbol-to-symbol transition probabilities. The sequence of symbols is provided to both a grouping phase and to a channel coding module, wherein the channel coding information is subsequently used in $\{+1, -1\}$ format to multiply an output of the grouping phase, to obtain a symbol sequence carrying also the parity information from the channel coder. The resulting modulated transmission has been demonstrated to have advantageously low PAPR.

Figure 1:
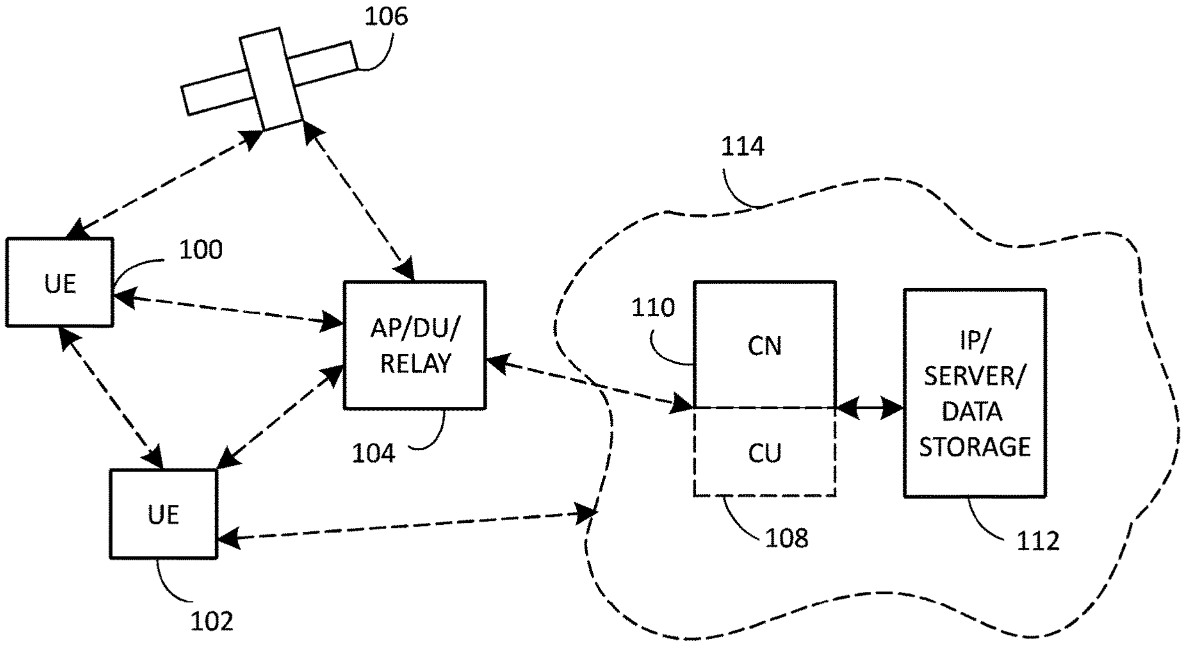
FIG. 1 illustrates an example system in accordance with at least some embodiments.

FIG. 1 illustrates an example system in accordance with at least some embodiments. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. Indeed, the transmission scheme disclosed herein may be applicable to 6G and other systems, as well. A person skilled in the art can appreciate that the embodiments may also be applied to other kinds of communications networks having suitable means by adjusting parameters and procedures appropriately.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties. Examples of such other communication systems include microwave links and optical fibers, for example.

The example of FIG. 1 shows a part of an exemplifying radio access network. FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. A physical link comprises a modulated signal transmitted from a transmitting transceiver and received in a receiving transceiver. A modulated signal, in turn, comprises modulation symbols of a modulation constellation in use on the physical link. A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of the communication system it is coupled to. The NodeB may also be referred to as a base station, an access point or any other type of interfacing device including a relay station such as a distributed unit, DU, part of LAB (integrated access and backhaul) node capable of operating in a wireless environment. The DU part may facilitate the gNB functionalities of the IAB node. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device, also called UE, user equipment, user terminal or terminal device, illustrates one type of an apparatus to which resources on the air interface are allocated and assigned, and thus any feature described herein with a user device may be implemented with a corresponding apparatus, also including a relay node. An example of such scenario is MT (mobile termination) part of IAB node, which provides the backhaul connection for the IAB node.

The user device, or user equipment, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. Some user equipments are not portable.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as LTE. Integration with the LTE may be implemented, at least in the early phase, as a system, where macro coverage is provided by the LTE and 5G radio interface access comes from small cells by aggregation to LTE. In other words, 5G is planned to support both inter-RAT operability (such as LTE-5G) and inter-RI operability (inter-radio interface operability, such as below 6 GHz-cmWave, below 6 GHz-cmWave-mmWave).

Through the development of NR, new frequencies than long term evolution (LTE) have been made available in frequency range 2, FR2 (28 GHz to 39 GHz). In addition, extension of NR beyond 52.6 GHz to 71 GHz in the NR specifications is included in Release 17. As a result of using higher frequencies, the signal will suffer higher path loss, with the consequent of limiting the UL coverage. One issue identified during the deployment of New Radio (NR) systems is the uplink (UL) limited coverage for all frequencies and more critical for high frequencies. To address this issue, one outcome is supplementary UL, SUL, which utilizes a UL carrier in a lower frequency band in addition to a 5G carrier on a higher frequency band. The main drawbacks of SUL are the additional cost of using additional lower frequencies and the complexity added at both user equipment (UE) and gNB side.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). Application of cloudRAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices. Each satellite 106 in the satellite constellation may cover several satellite-enabled network entities that create on-ground cells. The on-ground cells may be created through an on-ground relay node 104 or by a gNB located on-ground or in a satellite.

Sub-THz frequencies (100 GHz-300 GHz) are expected to be a part of 6G. Coverage limitation, mainly involving uplink, is one of the main challenges in using sub-THz frequencies. The physical layer, PHY, should be designed to address the constraints in sub-THz starting from NR PHY as baseline, for example. The PHY design for 6G should address, waveforms and modulation with low peak-to-average-power ratio, PAPR. One main design direction to enhance the UL performance for a 6G wireless communication system (mainly for higher frequencies) is to design lower PAPR transmission schemes for higher order constellations. This can allow a reduction in back off, providing the benefit that power amplifier efficiency is enhanced and energy consumption of UEs is reduced. Further, an increase the UE transmit power to work close to $P_{saturation}$ to improve UL performance as UE is able to transmit higher power.

In unlicensed-band NR operation, a bandwidth part, BWP, may comprise plural sub-bands separated from each other by guard bands. The sub-bands may be, but need not be, 20 MHz wide, for example. Operation on the BWP may proceed based on sub-band specific listen-before talk, LBT, operation. In LBT, a node desiring to use a spectrum resource will listen on the resource before using it, and only proceed to transmit on the resource in case the listening indicates the resource appears to be free, that is, not currently in use. Simultaneous use of the same resource by plural transmitters leads to interference and decreased quality of communication on the resource.

A bandwidth part, BWP, is a contiguous set of physical resource blocks, PRBs, on a given carrier. A carrier bandwidth may be 40 MHz, 80 MHz or 160 MHz, for example. These PRBs are selected from a contiguous subset of the usable common resource blocks for a given numerology on a carrier. A BWP may be characterized by the following features: subcarrier spacing, SCS, sub-band number and sub-band bandwidth. SCS may take values such as 15 kHz, 30 kHz or 60 kHz, for example. A carrier may comprise 2, 3, 4, 5 or 8 sub-bands of 20-MHz bandwidth, for example. A PRB may have 12 subcarriers, for example. Likewise, a normal scheduling unit in time (known as a slot) may be 12 or 14 OFDM symbols long, for example.

As noted above, existing PAPR management solutions, such as FDSS and tone reservation, do not function as well with higher-order modulation. The present disclosure aims to facilitate PAPR control also in higher-order modulation, such as QAM-16 or QAM-32. In detail, a group-based approach of handling time domain symbols, which are symbols at the input of a DFT, is described. The approach considers transition likelihoods between symbols. PAPR is reduced by imposing criteria on transitions between symbols, for example symbols in the same group. This is accomplished by using a distribution matcher to process an input bit sequence, which is the information bit sequence to be communicated to the receiver, into a modulation symbol sequence such that transition frequencies between the modulation symbols are not equally distributed, but certain symbol-to-symbol transitions are more likely than others. Thus it is achieved, that symbol-to-symbol transitions associated with higher power fluctuations are performed less frequently than symbol-to-symbol transitions with lower power fluctuations, reducing overall PAPR. Thus a sequence of symbols, such as QAM symbols, is obtained to the input of DFT-s-OFDM, for example, following a pre-defined transition. This disclosure primarily discusses QAM constellations but the disclosure can be extended to other types of modulation as well. This solution has been presented herein for 16-QAM but without loss of generality it can be extended to modulation orders greater than 16. In this disclosure, a group with cardinal of 2, built from 2 modulation symbols, is discussed but principles of this disclosure can be extended to a group with cardinal C>2.

A Markov chain may be used to model the transition between time domain QAM symbols, such as consecutive symbols. To control the transition between consecutive QAM symbols, a Markov chain may be considered as a stochastic model describing a sequence of possible events in which the probability of each event depends only on the state attained in the previous event. In-phase, I, and Quadrature, Q, dimensions of QAM symbols may be modeled independently of each other. A possible event represents a QAM symbol. Thus the Markov chain can be used to have a pre-defined rule for the characteristic of the target generated sequence. A sequence of symbols is in particular generated, the symbols belonging to a same group satisfy a pre-defined set of transition probabilities. The rule may be determined using a Markov chain or by numerical modelling, for example. The symbol sequence is generated using the input bit sequence which has a uniform distribution, that is, it resembles pseudo-random bits.

The disclosed method may ensure that the QAM symbol groups of the sequence at the output of the channel encoder, e.g. LDPC encoder, satisfies the pre-defined set of transition probabilities. In the symbol sequence output from a distribution matcher, frequencies of symbol to symbol transitions in the symbol sequence conform to the probabilities in the set of probabilities in the pre-defined set of probabilities. By this it may be meant that the frequencies of symbol to symbol transitions in the symbol sequence in a group are closer to the pre-defined set of probabilities than to a set of equal frequencies of symbol to symbol transitions, where no symbol transitions are favoured. Alternatively, it may be meant that the frequencies of symbol to symbol transitions in the symbol sequence deviate, on average, by at most 1%, 5% or 10% from an exact correspondence with the pre-defined set of probabilities.

Figure 2A:
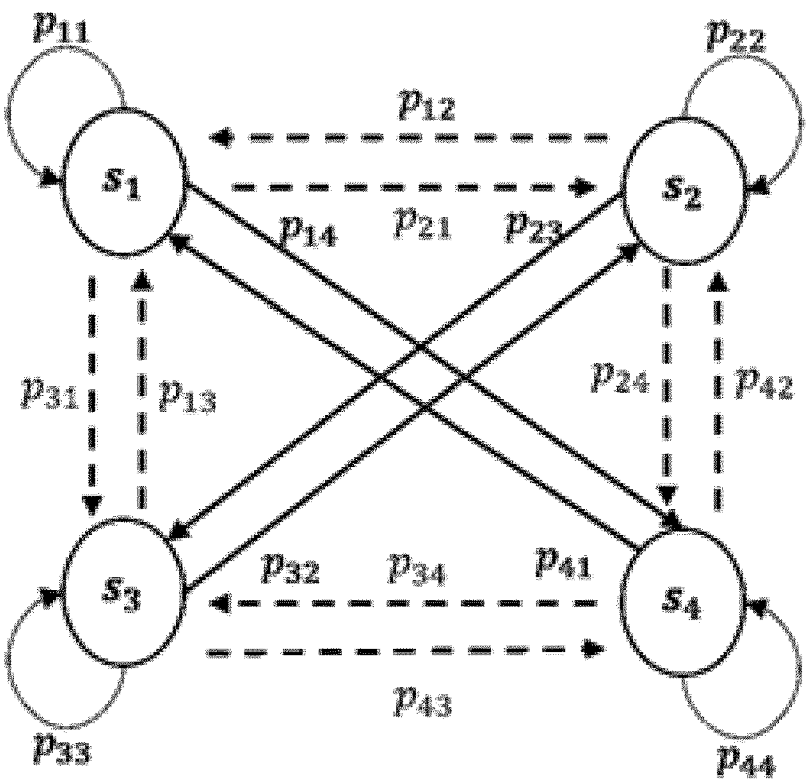
FIG. 2A illustrates a four-state diagram.

FIG. 2A illustrates a four-state diagram. The four states $s_1$, $s_2$, $s_3$ and $s_4$ are illustrative but may be seen to correspond to I and Q elements of QAM symbols in a modulation constellation. The transition probabilities $p_{ij}$ denote the likelihood of symbol $s_i$ following symbol $s_j$. In principle, when encoding a pseudo-random input bit sequence, one would expect the probabilities $p_{ij}$ to be equal. However, using distribution matching, it is possible to skew the set of probabilities to use more of the transitions associated with lower power fluctuations, and rely less on transitions associated with higher power fluctuations. This using the distribution matching, the PAPR may be dependably reduced.

A transition matrix may be defined as $$P_{N\times N}=\begin{bmatrix} p_{12} & \cdots & p_{1N} \\ \vdots & p_{ij} & \vdots \\ p_{N\to 1} & \cdots & p_{NN} \end{bmatrix}$$

where $p_{ij}\neq 0$ is the transition probability between symbols $s_i$ and $s_j$, $$i, j\in\{1, \ldots, N\}, \text{ and } \sum_{i=1}^{N} p_{ij}=1,$$

$$j\in\{1, \ldots, N\} \text{ and } \sum_{j=1}^{N} p_{ij}=1, i\in\{1, \ldots, N\}.$$

Thus the probability to have a group of cardinal C=2 (pair), $(s_i,s_j)$, can be derived as $\Pr((s_i,s_j))=\Pr(s_j)*p_{ij}$, Where $\Pr(s_j)$ is the probability of symbol $s_j$, $j\in\{1, \ldots, N\}$ which is initially uniform according to the distribution of information bits.

When designing the pre-defined set of transition probabilities, the constraint of transition may be mapped to an N-state Markov process. In case of 16-QAM, the I/Q samples belong to the set {±1, ±3}. Thus 16-states Markov process are used. To simplify the method, we may consider independently the In-phase and the Quadrature phase symbols. Thus a 4-state Markov process could be used wherein the states represent the In-phase and Quadrature-phase symbols, and transitions between states are labeled with corresponding probability values. Also non-Markov based methods may be used to derive the pre-defined set of transition probabilities.

In particular, the following kinds of state transitions are associated with higher power fluctuations: Firstly, transitions between two states (symbols, $s_1$, $s_2$) in case $s_1$ and $s_2$ belong to different circles $$\left(\left|\frac{s_1}{s_2}\right| \neq 1\right).$$

The more the metric $$\frac{||s_2| - |s_1||}{\min(|s_1|, |s_2|)}$$

is high, more the associated transition probability should be set low to keep PAPR low. Secondly, transitions between two states (symbols, $s_1$, $s_2$) in case the transition between $s_1$ and $s_2$ crosses the origin of the modulation constellation. Achieving these two criteria together is difficult to realize for high-order modulation. Thus, the transition matrix can be determined by numerical simulations, for example Monte Carlo simulations, to yield the lowest PAPR. Greedy algorithms can be used to have a locally optimal solution. The transition matrix which allows minimum PAPR is selected. It should be noted, that the globally minimum PAPR is not necessary, rather, benefits of the herein disclosed mechanism are achieved with sets of transitions probabilities which are associated with lower PAPR, even if it is not the overall best set of symbol-to-symbol transition probabilities. In some embodiments, a Markov process is used to model the transitions between consecutive symbols, and optimized Markov process coefficients that produce a sequence with minimum PAPR (or cubic metric, CM) are selected for use as the pre-defined transition probabilities from modulation symbol to modulation symbol.

An example of an optimized set of transition probabilities, that is, an example transition matrix, is:

$$\begin{bmatrix} 0.05 & 0.05 & 0.45 & 0.45 \\ 0.05 & 0.05 & 0.45 & 0.45 \\ 0.45 & 0.45 & 0.05 & 0.05 \\ 0.45 & 0.45 & 0.05 & 0.05 \end{bmatrix}.$$

The distribution matcher will be described next. The distribution matcher takes as input an input bit sequence of uniform distribution, and outputs a signed amplitude sequence of modulation symbols, which conforms in its frequencies of symbol-to-symbol transitions to the probabilities in the pre-defined set of probabilities, in other words, the distribution matcher outputs a symbols sequence which is associated with lower PAPR than a symbols sequence obtained by directly encoding the input bit sequence. The distribution matcher uses probabilistic amplitude shaping, PAS, which is a shaping method based on a non-uniform probability distribution of modulation symbols.

The input bit sequence is expected to have a uniform distribution. The input bit sequence is used as the input of a distribution matcher to generate a sequence of symbols such that the sequence of symbols in a group replicates as closely as feasible the pre-defined transition probabilities of in-phase and quadrature amplitude symbols are close to the probabilities described in the pre-defined transition matrix.

$b_j \in \{0,1\}$, j=0, . . . , M. $x_j \in \{s_1, \ldots, s_N\}$, j=0, . . . , L. In the example of a constellation with order m=4, like, 16-QAM, N=4, $$L = \frac{M}{\frac{m}{2} * R_{DM}}.$$

Where $R_{DM}$ is the distribution matcher rate and it depends on the choice of the distribution matcher. A rate of distribution matcher is computed as the ratio of input bits of the distribution matcher component at the numerator to the number of symbols, at the output of the distribution matcher, multiplied by the modulation order at the denominator.

The encoded system will be described next with reference to FIG. 2B. A wireless or wire-line communication system may include a channel encoder to protect the information bits that are to be communicated. The herein disclosed method allows channel encoding without breaking the transition-probabilities distribution of the information amplitude sequence at the distribution matcher output, that is, the channel coding does not impair PAPR. In detail, the distribution matching takes place before channel coding.

Figure 2B:
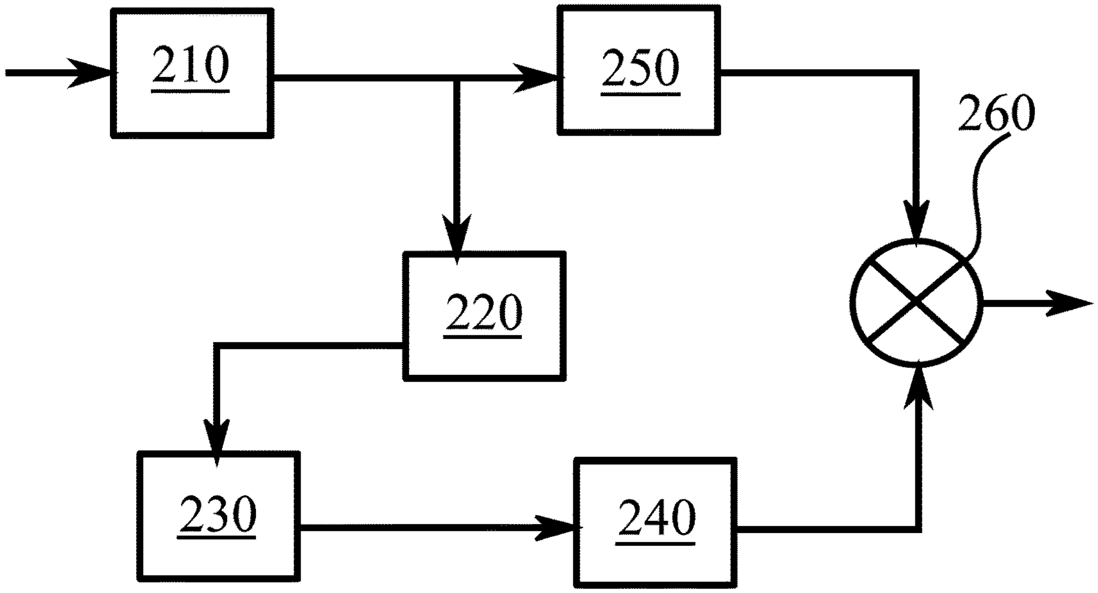
FIG. 2B illustrates a system in accordance with at least some embodiments of the present disclosure.

FIG. 2B illustrates a system in accordance with at least some embodiments of the present disclosure. The input bit sequence $b_0, b_1, \ldots, b_M$ is provided to distribution matcher 210, which outputs an amplitude symbol sequence $x_0, x_1, \ldots, x_L$ to a pairing stage (the stage is a pairing stage when each group has two symbols) 250 and to an amplitude to binary mechanism 220. As has been described herein above, the symbol sequence output from distribution matcher 210 to a group conforms to the pre-defined symbol transition probabilities, thereby obtaining reduced PAPR.

In the amplitude to binary mechanism 220, the symbols output from distribution matcher 210 are converted to binary numbers using a labelling scheme, such as, for example, grey labelling. This binary output of mechanism 220 is input to a channel coder 230, such as an LDPC coder, for example. The channel coder encodes the binary input to output parity bits $p_0, p_1, \ldots, p_{(L+1)/2}$ to a sign function 240. In general, systematic codes such as LDPC or polar codes may be used, where information bits and parity bits can be separated.

Sign function 240 takes a sequence of binary {0, 1} as input and outputs a corresponding sequence of unity and negative unity {−1, +1}, by mapping each zero to negative unity, −1, for example. The output of sign function 240 becomes $\{2p_0-1, 2p_1-1, \ldots, 2p_{(L+1)/2}-1\}$ Pairing stage 250 (if the groups have more than two symbols, the pairing stage is a grouping stage) groups the distribution matcher output by assigning symbols of the symbol sequence into groups of two or more symbols, $\{(x_0, x_1), \ldots, (x_{L-1}, x_L)\}$. The distribution matcher output may be limited by removing a symmetric part, in practice, the distribution matcher output may be comprised of a symmetric part only to begin with. For example: the generated set of pairs at the output of the distribution matcher for 16-QAM would be: ≡(−3,−3), (−3,−1),(−3,1),(−3,3),(−1,−3),(−1,−1),(−1,1),(−1,3)}. The groups output by pairing stage 250 are output to multiplication stage 260, where they are multiplied one by one by the outputs of sign function 240, correspondingly. In other words, each group is multiplied by one unity or one negative unity. Since we are multiplying the pairs/groups which already contain signed symbols at the output of pairing stage 250 with the signs output of sign function 240, we are generating the entire set including the symmetric part of the groups. The output of multiplication stage 260 becomes $\{(2p_0-1)*(x_0, x_1), \ldots, (2p_{(L+1)/2}-1)*(x_{L-1}, x_L)\}$ One aspect of the present disclosure is related to methods to pair/group the symbols as described in FIG. 2B, pairing stage 250. The aim is to ensure that the modulated paired/grouped symbols of the systematic encoded bits conform to the pre-defined probability matrix. In the process described above, we assume the rate of a systematic channel encoder is matched with the pairing and order of modulation. In other words, if we consider the 16-QAM example, a pair of symbols represents 2(cardinal)*2(modulation order divided by 2)=4 bits. And 1 parity bit is needed to the sign. Thus mainly the systematic channel encoder should have a rate of $$\frac{C*\frac{m}{2}}{\left(C*\frac{m}{2}+1\right)}=\frac{4}{5}.$$

This limitation can be relaxed with the modification described herein below when channel encoder rate is higher than $$\frac{C*\frac{m}{2}}{\left(C*\frac{m}{2}+1\right)}.$$

Given an encoder rate $$R_c=\frac{k}{n},$$

we make use of a set of information bits of size $$U_2=\frac{n}{(m+1)}-n+k$$

where m is the modulation order. These bits are concatenated with the binary output of phase 220 of FIG. 2B and passed through the encoder. The parity bits alongside the $U_2$ bits are directly mapped into sign bits to be multiplied with the information amplitude sequence as in multiplication stage 260, see FIG. 3A. In case the channel encoder rate is lower than $$\frac{C*\frac{m}{2}}{\left(C*\frac{m}{2}+1\right)},$$

the remaining parity bits may be sent using a legacy method, which can reduce the gain achieved in terms of PAPR.

Figure 3A:
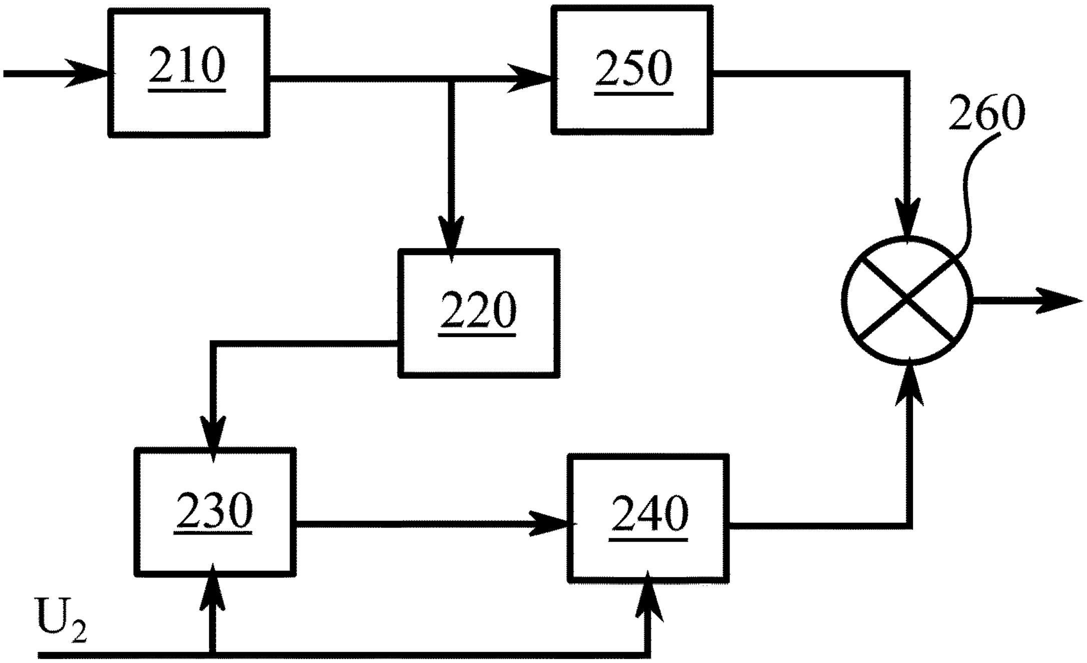
FIG. 3A illustrates a system in accordance with at least some embodiments of the present disclosure.

FIG. 3A illustrates a system in accordance with at least some embodiments of the present disclosure. This figure resembles FIG. 2B, and like numbering denotes like structure as in FIG. 2B. Here the $U_2$ bits are fed to the channel coder 230 and sign function 240, as illustrated, enabling higher rates.

Figure 3B:
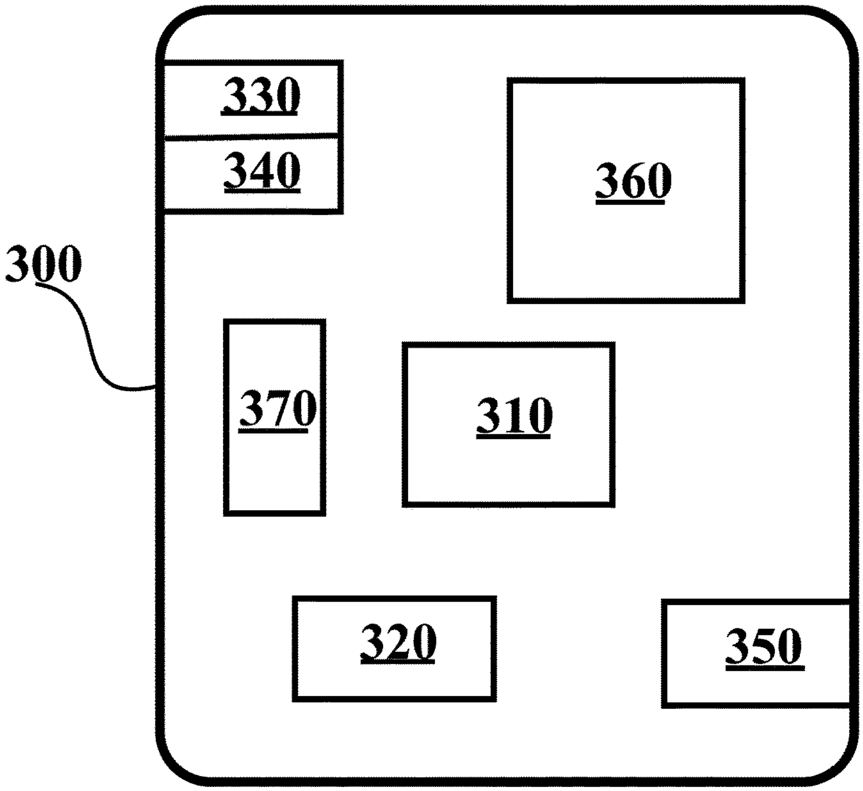
FIG. 3B illustrates an example apparatus capable of supporting at least some embodiments of the present disclosure.

FIG. 3B illustrates an example apparatus capable of supporting at least some embodiments of the present disclosure. Illustrated is device 300, which may comprise, for example, a mobile communication device such as user device 100 of FIG. 1 or, in applicable parts, a base station or access point. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as storing, processing, generating, assigning and multiplying, for example. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present disclosure.

Figure 4:
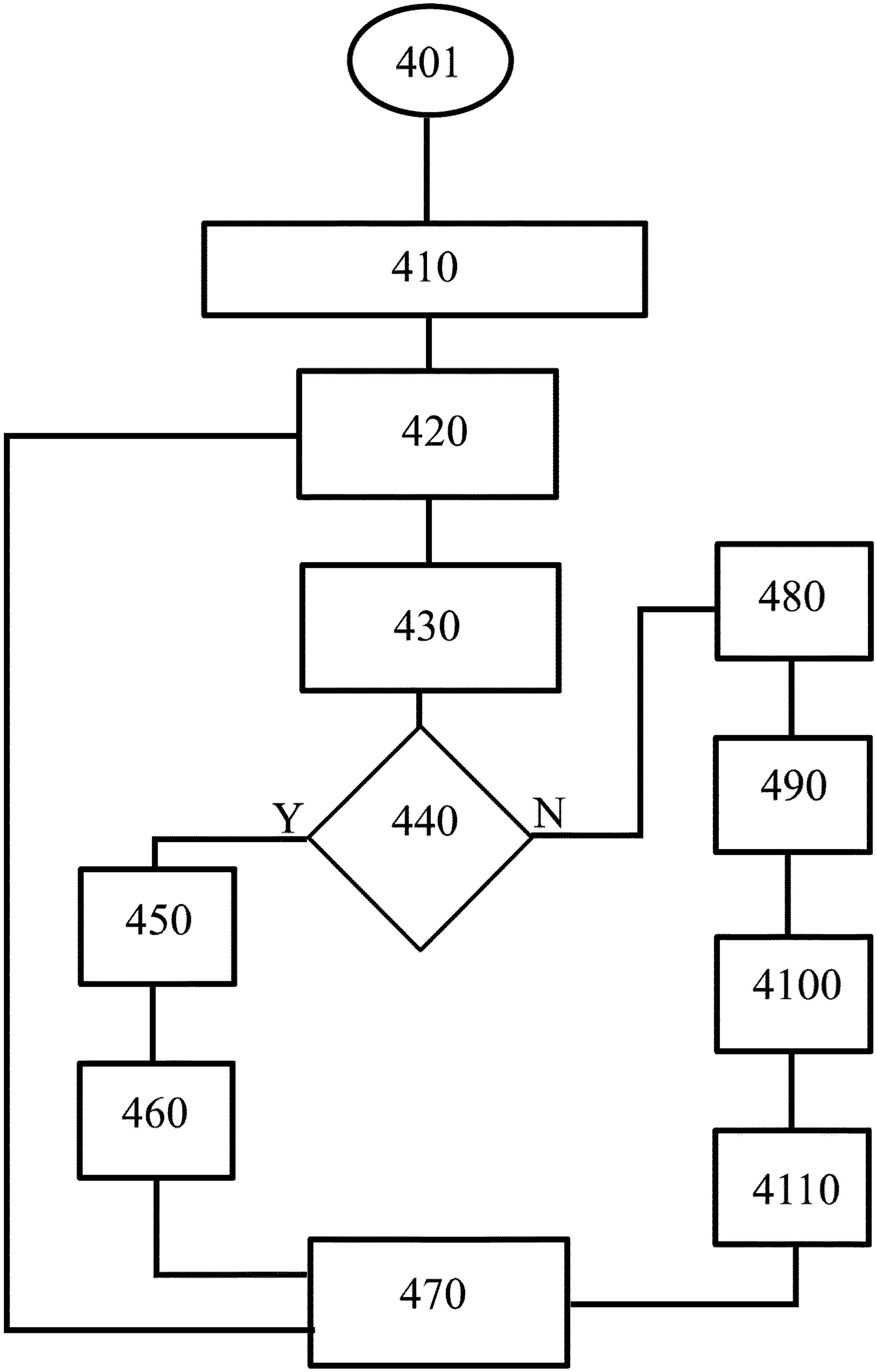
FIG. 4 an example process in accordance with at least some embodiments of the present disclosure.

FIG. 4 an example process in accordance with at least some embodiments of the present disclosure. In this flow chart, the example is presented for the real and imaginary parts of the constellation independently, that is, this is for the I real symbols and the same can be repeated for the Q. In this process, a modulation scheme of order m is used with constellation A. Input bits $b_0, b_1, \ldots, b_M$ are used, as in FIG. 2B. LDPC rate k/n is used, and symbol pairs are formed: $(x_1, x_2)_1, \ldots, (x_{2V\_1-1}, x_{2V\_1})_{V\_1}$, $x_i$ in a real part of A. Distribution matcher rate $R_{DM}=M/(mV_1)$.

The process commences in phase 401. In phase 410, distribution matcher parameters are defined, a matrix P of size $$2^{\frac{m}{2}}\times 2^{\frac{m}{2}}.$$

In phase 420, a sequence of pairs of symbols from pairs constellation (the set of all possible pairs from the real part of the constellation), where for each pair its probability is aligned with pre-defined matrix P: $(x_1, x_2)_1, \ldots, (x_{2V\_1-1}, x_{2V-1})_{V\_1}$. Here $V_1=n/(m+1)=M/(m\times R_{DM})$.

In phase 430, the sequence of symbol pairs is converted to binary numbers according to a bitmap. From phase 430 processing advances to phase 440, where it is determined, if the LDPC rate k/n=m/(m+1). If this is the case, processing advances from the "Y" fork to phase 450. In phase 450, LDPC encoding proceeds to output $c_1c_2 \ldots c_k t_{k+1} \ldots t_n$ with $c_i$ referring to systematic information and t; is for the parity bits. Subsequently, in phase 460 parity bits are converted to unity and negative unity (signs), and fed to multiplication stage 470 where the pairs of symbols are multiplied one for one with the output of phase 460.

On the other hand, of the assessment in phase 440 is that the equality does not hold, processing advances through the "N" fork to phase 480, where a sequence of information bits of size $U_2$ is formed, where $U_2=V_1-(n-k)$: $b'_1, b'_2, \ldots, b'_{U2}$.

In phase 490, the sequence of information bits from phase 480 is concatenated with the symbol string: $s_1s_2 \ldots s_k b'_1, b'_2, \ldots, b'_{U2}$.

In phase 4100, LDPC encoding is performed with output $c_1c_2 \ldots c_{k'+U2}t_{k'+U2+1} \ldots t_n$. Subsequently, in phase 4110, the parity bits and $U_2$ bits are converted to signs such that 0 is mapped to −1, and 1 is mapped to 1:

$$\left(-1^{t_{k'+U_2+1}}, -1^{k'+U_2+2}, \ldots, -1^{t_n}, -1^{b'_1}, -1^{b_{2'}}, \ldots, -1^{b_{U'_2}}\right)$$

Once the signs are obtained from phase 4110, they are used to multiply the symbol pairs in phase 470. The symbol pairs are obtained from phase 420, as illustrated in the Figure.

Concerning the receiver, to allow this method to be enabled, the receiver should be aware about the distribution matcher function applied at the transmitter side. The distribution matcher inverse should be applied at the receiver side to recover the information bits. Different approaches may be applied for signalling the distribution matcher function to receiver, firstly, different distribution matcher functions are pre-defined in specifications of e.g. 3GPP. Both the receiver and the transmitter know the pre-defined rules. Secondly, signalling from the transmitter may be used. In an embodiment, a transition matrix comprises a set of probabilities of transitions between modulation symbols, the set of probabilities corresponding to a lower peak-to-average power ratio than a set of equal probabilities of transitions between modulation symbols. Semi-static or dynamic signalling of the set of probabilities and a rate of distribution matcher from a transmitter e.g. of a user device to a receiver e.g. of a network device can be applied. In an embodiment, the set of probabilities and the rate of distribution matcher are dynamically signalled per modulation order.

At receiver side, the inverse of the distribution matcher used in the transmitter should be applied. The distribution matcher inverse may in particular be applied at the LDPC decoder output. At the detection stage, the transition probability between consecutive symbols should be considered at the receiver side to improve the BLER performance. Thus, the computation of LLR should consider the transition probability in each group $$LLR(q) = \ln\frac{Pr(c_q = 1 \mid \hat{s})}{Pr(c_q = 0 \mid \hat{s})} =$$

$$\ln\frac{\sum_{s\in S_1^q} p(\hat{s} \mid s)Pr(s)}{\sum_{s\in S_0^q} p(\hat{s} \mid s)Pr(s)} = \ln\frac{\sum_{s\in S_1^q} \exp\left(-\frac{\|\hat{s} - w*h*s\|^2}{\sigma^2}\right)Pr(s)}{\sum_{s\in S_0^q} \exp\left(-\frac{\|\hat{s} - w*h*s\|^2}{\sigma^2}\right)Pr(s)}$$

here s is a pair (or more generally a group) of real or imaginary modulation symbols, q represents the index of bit number q in the label associated to the pair of symbol s, $$S_1^q$$

refers to the sub-constellation where bit number q is equal to 1. The main constellation is 2-dimension constellation of the used modulation. For example, in case of 16-QAM, the main constellation is 16-QAM×16-QAM, thus each pair s can be written as $s=(s_1,s_2)$ where $s_1$ and $s_2$ belongs to the real part of 16-QAM and correspondingly the imaginary part of the same is repeated for the Quadrature symbols. $\hat{s}$ is the equalized pair e.g. $\hat{s}=(\hat{s}_1, \hat{s}_2)=w*h*s+n$. Where w is the equalization coefficient, h is the channel realization, and n is the AWGN with variance equal to $\sigma^2$. The Pr (s) where s∈

$$S_1^q$$

or s∈

$$S_0^q$$

contains the transition probability between the symbol of the pairs.

Figure 6A:
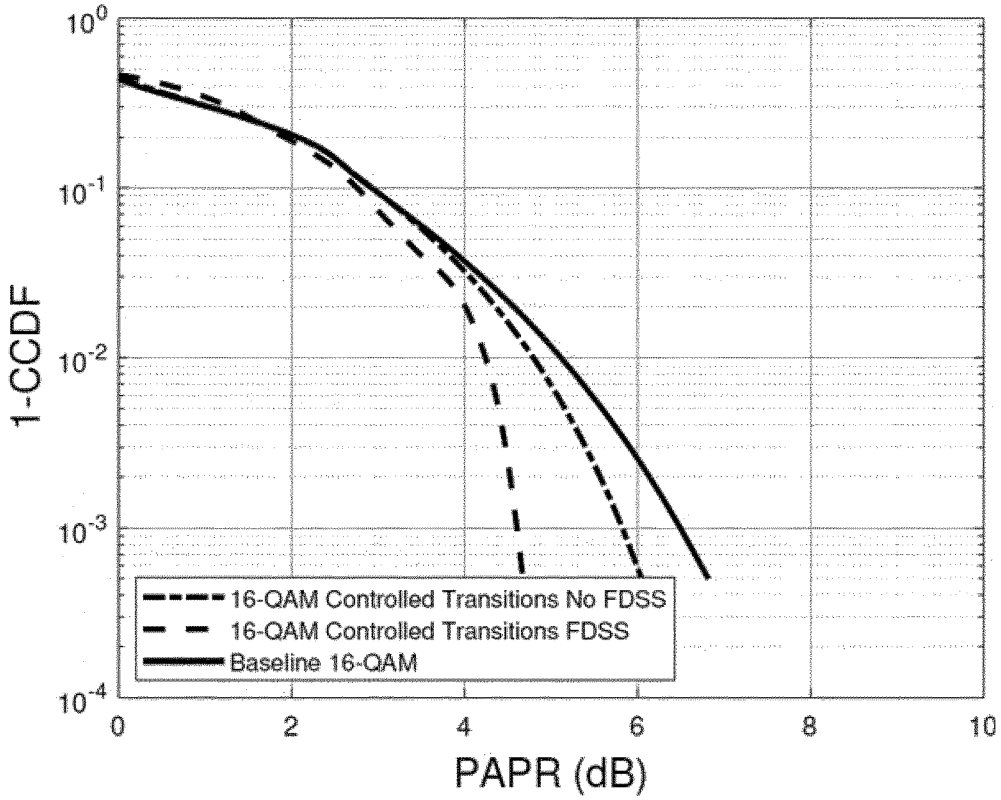
FIGS. 6A-6C illustrate gains to be obtained from the disclosed mechanism.
Figure 6B:
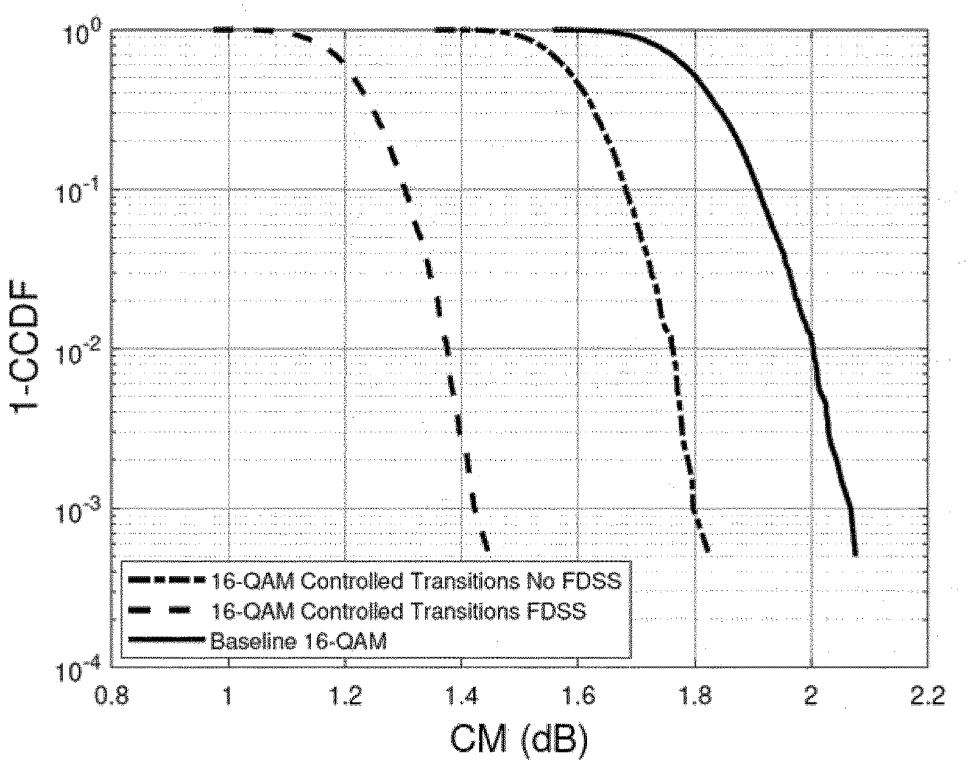
Figure 6C:
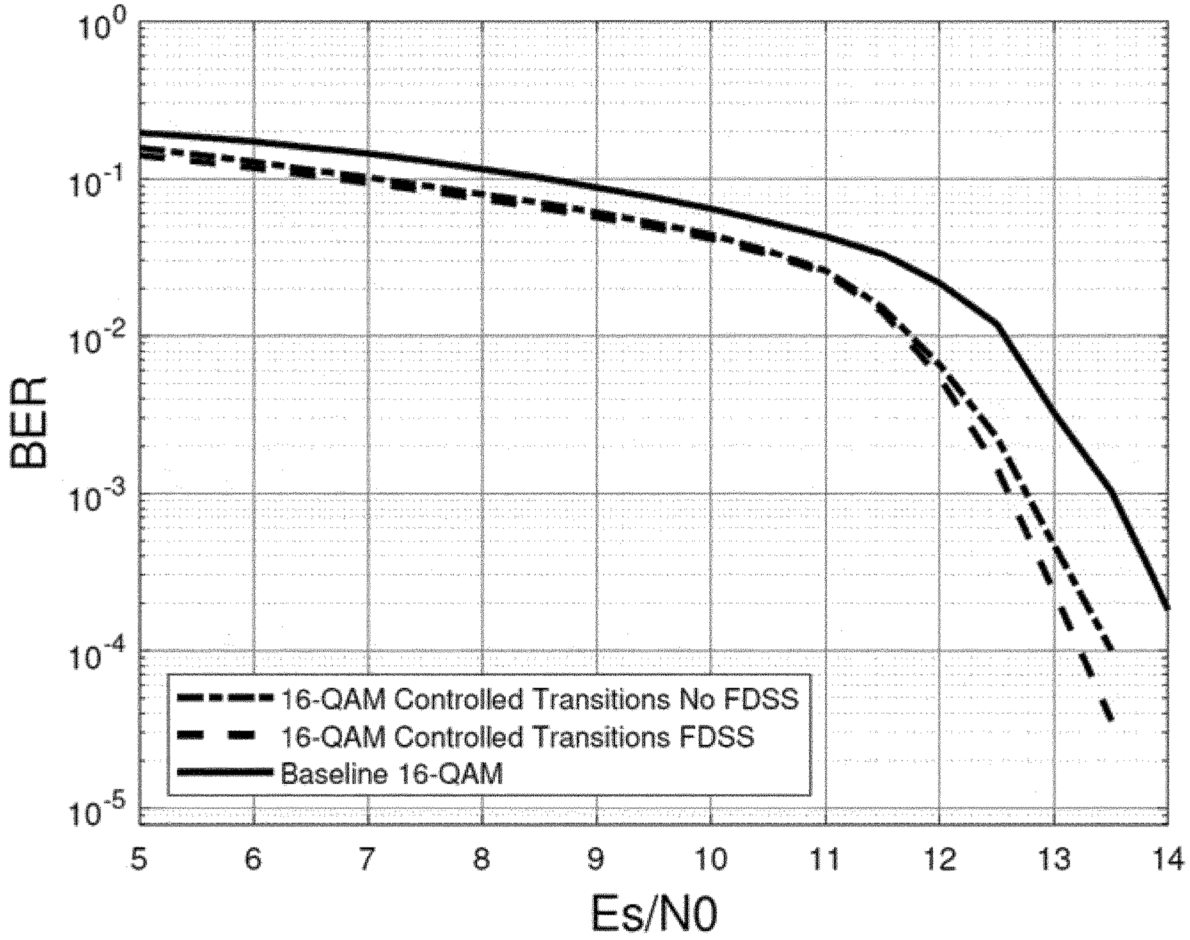

Concerning performance, FIGS. 6A-6C illustrate gains to be obtained from the disclosed mechanism, in detail, in PAPR without FDSS, a 0.66 dB gain is observed without FDSS and a 0.75 dB gain in BER, resulting in 1.41 dB gain without FDSS. In CM without FDSS, a 0.27 dB gain is observed without FDSS and a 0.75 dB gain in BER, resulting in 1.02 dB gain without FDSS. In PAPR with FDSS, a 1.89 dB gain is observed with FDSS and a 1 dB gain in BER, resulting in 2.89 dB gain with FDSS. In CM with FDSS, a 0.63 dB gain is observed with FDSS and a 1 dB gain in BER, resulting in 1.63 dB gain with FDSS.

Figure 5:
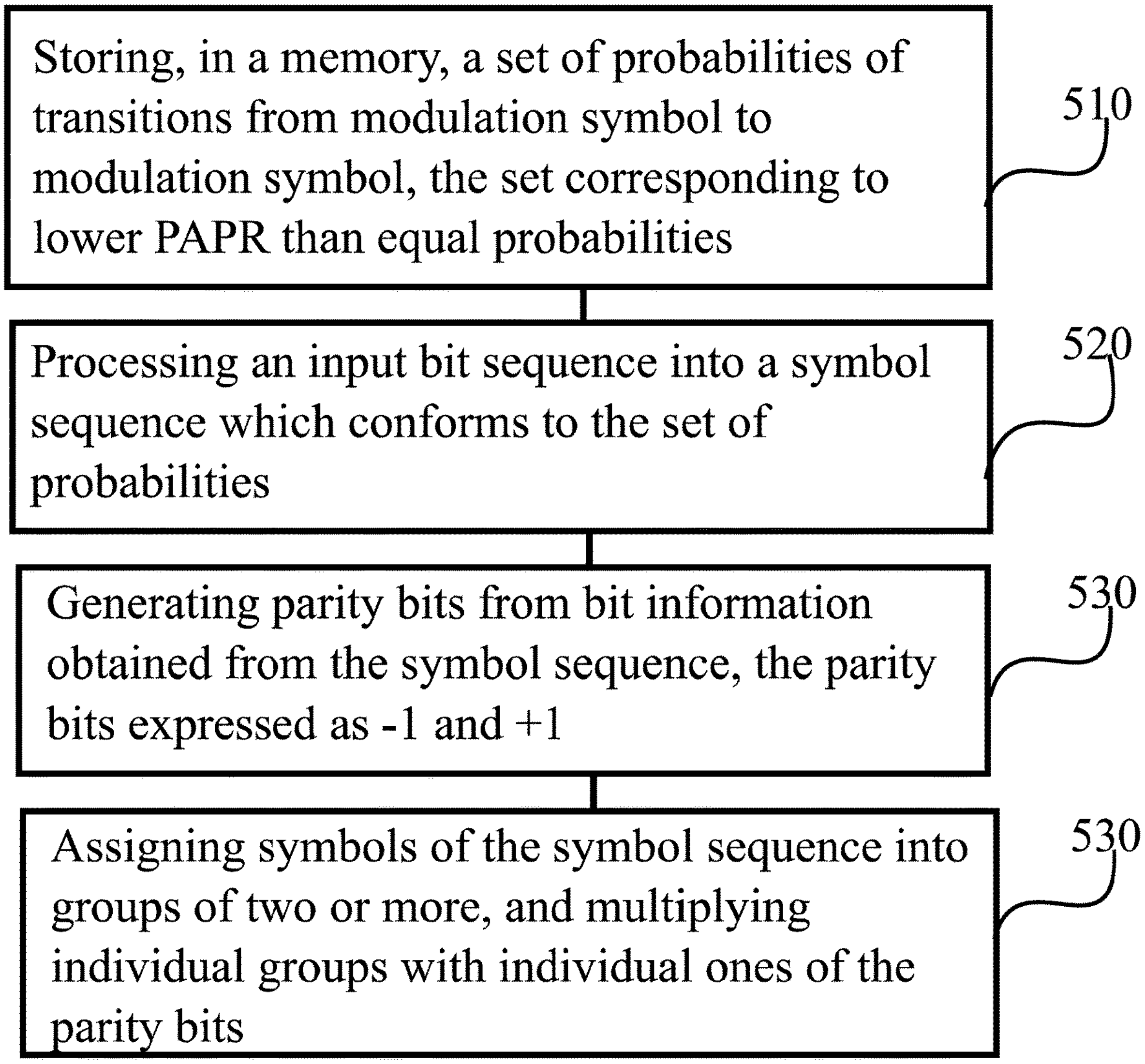
FIG. 5 is a flow graph of a method in accordance with at least some embodiments of the present disclosure.

FIG. 5 is a flow graph of a method in accordance with at least some embodiments of the present disclosure. The phases of the illustrated method may be performed in a transmitter, for example.

Phase 510 comprises storing, in a memory, a set of probabilities of transitions from modulation symbol to modulation symbol, the set of probabilities corresponding to a lower peak-to-average power ratio than a set of equal modulation symbol to modulation symbol transition probabilities. The transition probabilities may be for each sequence of modulation symbols in a group. Phase 520 comprises processing an input bit sequence into a symbol sequence, wherein frequencies of symbol to symbol transitions in the symbol sequence conform to the probabilities in the set of probabilities, Phase 530 comprises generating parity bits from bit information obtained from the symbol sequence, the parity bits being expressed as sequence of unity and negative unity. Finally, phase 540 comprises assigning symbols of the symbol sequence into groups of two or more symbols, and multiplying individual ones of the groups with individual ones of the parity bits.

It is to be understood that the embodiments of the disclosure disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. In addition, various embodiments and example of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present disclosure find industrial application in wireless or wire-line communication.

ACRONYMS LIST

3GPP 3$^{rd}$ generation partnership project
APSK amplitude and phase shift keying
BER bit-error rate
BLER block error rate
CM cubic metric
DFT discrete Fourier transform
DFT-s-OFDM discrete Fourier transform-spread OFDM
FDSS frequency domain spectral shaping
OFDM orthogonal frequency division multiplexing
LDPC low-density parity check code
LLR log-likelihood ratio
PAPR peak to average power ratio
PSK phase shift keying

The invention claimed is:

1. An apparatus comprising:

at least one processor, and at least one memory storing instructions that, when executed by the at least one processor, cause the apparatus at least to:

store a first set of probabilities of transitions between modulation symbols, the first set of probabilities corresponding to a lower peak-to-average power ratio than a second set of equal probabilities of transitions between modulation symbols;

process an input bit sequence into a symbol sequence, wherein frequencies of transitions between symbols in the symbol sequence conform to probabilities in the first set of probabilities;

generate parity bits from bit information obtained from the symbol sequence, wherein the parity bits are expressed as a sequence of unity and negative unity;

assign symbols of the symbol sequence into groups each comprising two or more symbols; and multiply each one of the groups with a corresponding one of the parity bits.

2. The apparatus according to claim 1, wherein the first set of probabilities comprises higher probabilities for transitions between modulation symbols on a same circle in a modulation constellation than for transitions between modulation symbols on different circles in the modulation constellation, and higher probabilities for transitions that do not cross an origin of the modulation constellation than for transitions that do cross the origin of the modulation constellation.

3. The apparatus according to claim 1, wherein the at least one memory and stored instructions are further configured to, with the at least one processor, cause the apparatus at least to:

output one half of a modulation constellation from the symbol sequence output such that the modulation constellation is restorable by the multiplying of the groups with the corresponding parity bits.

4. The apparatus according to claim 1, wherein the modulation symbols are of a QAM-16, QAM-32 or QAM-64 modulation scheme or a phase shift keying or an amplitude and phase shift keying modulation scheme.

5. The apparatus according to claim 1, wherein number of the symbols in each group is two.

6. The apparatus according to claim 1, wherein the at least one memory and stored instructions are further configured to, with the at least one processor, cause the apparatus at least to:

transmit the groups, after the multiplication with the parity bits, using discrete Fourier transform-spread orthogonal frequency division multiplexing.

7. The apparatus according to claim 1, wherein the at least one memory and stored instructions are further configured to, with the at least one processor, cause the apparatus at least to:

transmit a part of the input bit sequence to cause number of the parity bits to be equal to number of the groups.

8. The apparatus according to claim 7, wherein the at least one memory and stored instructions are further configured to, with the at least one processor, cause the apparatus at least to:

use the part of the input bit sequence to multiply a part of the groups, when expressed in the form of unity and negative unity.

9. The apparatus according to claim 1, wherein the at least one memory and stored instructions are further configured to, with the at least one processor, cause the apparatus at least to:

transmit the first set of probabilities to a network device or a user device.

10. An apparatus comprising:

at least one processor; and at least one memory storing instructions that, when executed by the at least one processor, cause the apparatus at least to:

store a first set of probabilities of transitions between modulation symbols, the first set of probabilities corresponding to a lower peak-to-average power ratio than a second set of equal probabilities of transitions between modulation symbols;

generate bit information from a received bit sequence, the apparatus being further configured to convert the bit information into a symbol sequence in amplitude domain; and process the symbol sequence into an input bit sequence, wherein frequencies of transitions between symbols in the symbol sequence conform to probabilities in the first set of probabilities.

11. The apparatus according to claim 10, wherein the at least one memory and stored instructions are further configured to, with the at least one processor, cause the apparatus at least to:

use the first set of probabilities when determining the input bit sequence from the symbol sequence.

12. The apparatus according to claim 10, wherein the at least one memory and stored instructions are further configured to, with the at least one processor, cause the apparatus at least to:

receive the first set of probabilities from a user device or a network device.

13. A method comprising:

storing, in a memory, a first set of probabilities of transitions between modulation symbols, the first set of probabilities corresponding to a lower peak-to-average power ratio than a second set of equal probabilities of transitions between modulation symbols;

processing an input bit sequence into a symbol sequence, wherein frequencies of transitions between symbols in the symbol sequence conform to the probabilities in the first set of probabilities;

generating parity bits from bit information obtained from the symbol sequence, wherein the parity bits are expressed as a sequence of unity and negative unity;

assigning symbols of the symbol sequence into groups each comprising two or more symbols; and multiplying each one of the groups with a corresponding one of the parity bits.

14. The method according to claim 13, wherein the first set of probabilities comprises higher probabilities for transitions between modulation symbols on a same circle in a modulation constellation than for transitions between modulation symbols on different circles in the modulation constellation, and higher probabilities for transitions that do not cross an origin of the modulation constellation than for transitions that do cross the origin of the modulation constellation.

15. The method according to claim 13, further comprising:

outputting one half of a modulation constellation from the symbol sequence output, such that the modulation constellation is restorable by the multiplying of the groups with the corresponding parity bits.

16. The method according to claim 13, wherein the modulation symbols are of a QAM-16, QAM-32 or QAM-64 modulation scheme or a phase shift keying or an amplitude and phase shift keying modulation scheme.

17. The method according to claim 13, wherein number of the symbols in each group is two.

18. The method according to claim 13, further comprising:

transmitting the groups, after the multiplication with the parity bits, using discrete Fourier transform-spread orthogonal frequency division multiplexing.

19. The method according to claim 13, further comprising:

transmitting a part of the input bit sequence is transmitted to cause number of the parity bits to be equal to number of the groups.

20. The method according to claim 19, further comprising:

using the part of the input bit sequence to multiply a part of the groups, when expressed in the form of unity and negativity unity.

* * * * *